United States Patent
De Cock et al.

(10) Patent No.: US 6,228,941 B1
(45) Date of Patent: May 8, 2001

(54) POWDER COATING OF GLYCIDYL-FUNCTIONAL COPOLYMER, DICARBOXYLIC ACID AND ACID-FUNCTIONAL POLYESTER

(75) Inventors: Christian Jean Charles De Cock; Carine Helena Paula Gerets, both of Louvain-La-Neuve (BE)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/189,571

(22) Filed: Nov. 11, 1998

(30) Foreign Application Priority Data

Dec. 24, 1997 (EP) .................................. 97204114

(51) Int. Cl.$^7$ .............................. C08L 33/14; C08L 67/02
(52) U.S. Cl. ........................................ 525/170; 525/934
(58) Field of Search ...................... 525/170, 934

(56) References Cited

U.S. PATENT DOCUMENTS

| | | | |
|---|---|---|---|
| 4,142,018 | * 2/1979 | Ozawa et al. ......................... | 428/323 |
| 5,397,641 | 3/1995 | Moens et al. ......................... | 428/357 |
| 5,399,384 | 3/1995 | Fushimi et al. .................... | 427/407.1 |
| 5,543,464 | 8/1996 | Decker et al. ........................ | 525/176 |
| 5,556,669 | 9/1996 | Sasaki et al. ........................ | 427/410 |
| 5,625,028 | 4/1997 | Barbee et al. ....................... | 528/272 |

FOREIGN PATENT DOCUMENTS

| | | |
|---|---|---|
| 2064292 | * 10/1992 | (CA) . |
| 431656 | * 6/1991 | (EP) . |
| 0509393 | 10/1992 | (EP) . |
| 0667371 A2 | 8/1995 | (EP) . |
| 0773268 A2 | 5/1997 | (EP) . |
| 2262676 | 9/1975 | (FR) . |
| 1087623 | * 10/1967 | (GB) . |
| WO 95/12639 | 5/1995 | (WO) . |
| WO 95/28452 | 10/1995 | (WO) . |

OTHER PUBLICATIONS

"Veova Mass Polymer for Outdoor Durable Powder Coatings," Technical Bulletin of Shell Chemicals, reprinted Aug. 1991.

Hackh's Chemical Dictionary, Fourth edition, McGraw–Hill Book Company, New York, New York, 1969, p. 27.*

Chemical abstracts accession No. 1986:52108, Reader, "Veova latexes or modern emulsion paints," Surf. Coat. Aust., 1985, vol. 22, No. 8, pp. 11–16.*

* cited by examiner

*Primary Examiner*—Robert E.L. Sellers

(57) ABSTRACT

A curable powder coating composition comprises (a) a copolymer produced from ai) 5 to 10 wt % of a $C_1$ to $C_4$ alkyl diester of an ethylenically unsaturated dicarboxylic acid, aii) 10 to 45 wt % of a glycidylester of an ethylenically unsaturated carboxylic acid, aiii) 10 to 35 wt % of an alkenyl ester of a branched tertiary carboxylic acid wherein the acid moiety contains nine carbon atoms, and aiv) 0 to 45 wt % of a $C_1$ to $C_{12}$ alkyl ester of an ethylenically unsaturated carboxylic acid having from 3 to 4 carbon atoms in the acid moiety, the percentages of ai) to av) are relative to the total weight of the polymer adding up to 100%; and (b) a blend comprising (bi) $C_4$ to $C_{16}$ (cyclo)aliphatic dicarboxylic acid and (bii) a polyester resin having an acid value of from 4500 to 4900 mmole/kg produced from a $C_5$ to $C_{12}$ branched polyhydroxyalkane and a $C_4$ to $C_{16}$ (cyclo)aliphatic dicarboxylic acid or anhydride in a polyhydroxyalkane:dicarboxylic acid molar ratio of from 0.2:1 to 0.4:1, blend (b) having an acid value of from 5000 to 10,000 and the acid:epoxy molar ratio being from 0.70:1 to 1.10:1.

14 Claims, No Drawings

POWDER COATING OF GLYCIDYL-FUNCTIONAL COPOLYMER, DICARBOXYLIC ACID AND ACID-FUNCTIONAL POLYESTER

The invention is relating to curable powder coating compositions, and to copolymers of ethylenically unsaturated monomers to be used therein.

More in particular the invention is relating to curable powder coating compositions, comprising an epoxy groups containing copolymer and an acid polyester.

Curable powder compositions are known from e.g. EP-A-0773268; EP-A-0728163; U.S. Pat. No. 5,625,028, and Technical Bulletin of Shell Chemicals "VEOVA mass polymer for outdoor durable powder coatings" August 1991, VM 5.1.

EP-A-0773268 describes acid epoxy curing type powder coating compositions, which comprised
A) an epoxy group containing acrylic resin prepared by polymerizing the monomer mixture, comprising
   (a) from 35 to 65 wt % of an epoxy group containing ethylenically unsaturated monomer, and
   (b) remainder amount of an ethylenically unsaturated monomer which is different from the monomer (a),
(B) a polycarboxylic acid, and
(C) an antioxidant having a melting point of from 50 to 140° C.

As monomers (b) were exemplified inter alia alkyl methacrylate, wherein alkyl represented methyl, butyl, ethyl, isobutyl, 2-ethylhexyl, lauryl, stearyl, and/or styrene and/or dialkyl esters of unsaturated dibasic acid. The polymerization was actually carried out in an organic solvent like xylene and in the presence of a peroxide radical polymerization catalyst. A component (B) decanedicarboxylic acid was mentioned.

EP-A-0728163 discloses powder coating compositions comprising a solid, particulate mixture of
(a) 60 to 90 wt %, based on the weight of (a) and (b) of an epoxy functional copolymer having a Tg of from 25° C. to 70° C., formed by polymerizing under free radical initiated polymerization conditions:
   (i) from 50 to 75 wt %, based on the weight of (i) and (ii) of a glycidyl functional ethylenically unsaturated monomer,
   (ii) from 25 to 50 wt %, based on the weight of (i) and (ii) of a copolymerizable ethylenically unsaturated monomer or mixture of monomers free of glycidyl functionality;
said epoxy functional copolymer containing from 3.0 to 5.9 moles of glycidyl groups per kilogram of epoxy functional copolymer;
(b) from 10 to 40 wt %, based on the weight of (a) and (b) of a polycarboxylic acid cross-linking agent;
wherein the ratio of epoxy functionality is 1:0.8 to 1, and wherein the powder coating composition has a melt viscosity of less than 5 Pa.s.

Preferably the copolymerizable ethylenically monomer (ii) is selected from the group consisting of alkyl acrylates, alkyl methacrylates containing from 1 to 20 carbon atoms in the alkyl group, vinyl aromatic compounds and vinyl aliphatic compounds. The comonomer (ii) is preferably isobornyl methacrylate.

In addition as (co)monomer component (iii) can be used a copolymerizable ethylenically unsaturated monomer different from (i) and (ii) and which is more preferably α-methylstyrene dimer.

From U.S. Pat. No. 5,625,028 thermosetting resin compositions are known, which provide coatings that allegedly possessed attractive weathering properties. The compositions comprised a semicrystalline polyester, consisting essentially of diol and/or triol residues and dicarboxylic acid residues. The diol residues had been selected from the group consisting of residues of 1,4-butanediol and 1,6-hexanediol, and the carboxylic acid residues were consisting essentially of residues of 1,4-cyclohexanedicarboxylic acid wherein at least 70% of said residues of 1,4-cyclohexanedicarboxylic acid are in trans form. The polyesters had an acid number of from 30 to 100 and an inherent viscosity of from 0.1 to 0.5 dl/g measured at 25° C. in a 60/40% by weight mixture of phenol/tetrachloroethane at a concentration of 0.5 g/dl.

In Technical Bulletin of Shell Chemicals "VEOVA mass polymer for outdoor durable powder coatings", reprinted August 1991, VM 5.1 a mass copolymer LR-259 was prepared from inter alia VEOVA 10 vinyl ester monomer, styrene, methyl methacrylate, dimethyl maleate, and glycidyl methacrylate with Trigonox B (di-tert-butyl peroxide).

These copolymers were combined with a carboxyl-functional polyester as curing agent, prepared from hexanediol and decane dicarboxylic acid in a molar ratio of 1 mole of hexanediol per 2 moles decane dicarboxylic acid, under nitrogen purge and in reflux/azeotropic distillation equipment, using toluene as solvent, at a temperature in the range from 130 to 200° C., in the presence of stannous octoate as catalyst and distillation of water and toluene. The polyester resin showed an acid content of 207 mg KOH/g.

It will be appreciated that the present and near future requirements of the industrial coating industry were not met by the curable coating compositions according to the hereinbefore discussed prior publications.

Therefore, due to increasing environmental and economic pressures, there is a strong need for further improved curable resin compositions, which provide an improved combination of physical properties of the cured coating films derived therefrom and meet the requirements from the industrial coating industry in the near future. In particular, it will be more desirable to meet the requirements to be put on automotive top coating compositions and coil coating compositions.

Moreover, it is aimed at to develop coating compositions which preferably can be cured at low temperatures, i.e. in the range of from 120 to 140° C.

Physical properties of the cured coating films, which have to be improved and/or better balanced in the final combination, are inter alia: acid resistance, transparency, colouring resistance during baking, weathering resistance, mar resistance and sealer cracking resistance.

Therefore it is an object of the present invention to provide curable resin compositions, providing cured coating films having improved individual properties and/or improved combinations, as specified hereinbefore.

Another object of the present invention is to provide a process for the preparation of a copolymer component to be incorporated into said curable resin compositions.

Accordingly, as one aspect of the present invention a curable powder coating composition is provided, comprising at least:
(a) a copolymer produced from
ai) from 5 to 10 wt % of an alkyl diester of an ethylenically unsaturated dicarboxylic acid, comprising an alkyl group, having from 1 to 4 carbon atoms and preferably 1 or 2;
aii) from 15 to 55 wt % of a glycidylester of ethylenically unsaturated carboxylic acid;
aiii) from 10 to 45 wt % of a phenylalkylene monomer having from 8 to 12 carbon atoms and preferably 8 carbon atoms;

aiv) from 10 to 35 wt% of an alkenyl ester of a branched tertiary carboxylic acid the acid moiety of which contains 9 carbon atoms;

av) from 0 to 45 wt% of an alkyl ester of an ethylenically unsaturated carboxylic acid, having from 3 to 4 and preferably 3 carbon atoms in the acid moiety, and wherein the alkyl group contains from 1 to 12 carbon atoms;

the respective percentages of the components ai) through av) are relative to the total weight of the copolymer, while the sum of all actual percentages =100%.

b) a blend of a bi) aliphatic or cycloaliphatic di-carboxylic acid comprising from 4 to 16 carbon atoms, preferably from 4 to 14 carbon atoms, and (bii) a polyester resin, derivable from a branched polyhydroxy alkane, having from 5 to 12 carbon atoms and an aliphatic or cycloaliphatic dicarboxylic acid, having from 4 to 16 carbon atoms and preferably from 4 to 14, or an anhydride thereof, in a molar ratio of from 0.2 to 0.4 mole of polyhydroxy alkane per mole of aliphatic or cycloaliphatic dicarboxylic acid, the polyester (bii) having an acid value of from 4500 to 4900 mmol/kg and the blend having an acid value from 5000 to 10,000, while the molar ratio between the acid groups and epoxy groups is in the range of from 0.70:1 to 1.10:1. Preferably the molar ratio between the acid groups and epoxy groups is in the range of from 0.75:1 to 1.00:1 and more preferably from 0.75:1 to 0.85:1.

Suitable monomers to be used as component ai) can be selected from e.g. dimethyl maleate, diethyl maleate, di-n-propyl maleate, di-n-butyl maleate, di-isopropyl maleate, dimethyl itaconate, diethyl itaconate, di-n-propyl itaconate, di-n-butyl itaconate, di-isopropyl itaconate, di-isobutyl itaconate, and the like. Preferred monomers ai) are dimethyl maleate or diethyl maleate, of which dimethyl maleate is most preferred.

Suitable monomers to be used as component aii) can be selected from e.g. glycidyl methacrylate, glycidyl acrylate, glycidyl crotonate, glycidyl cinnamate, and the like. Glycidyl methacrylate or glycidyl acrylate are most preferred.

Suitable monomers to be used as component aiii) can be selected from e.g. styrene, vinyltoluene, dimethylstyrene, α-methylstyrene and the like. Styrene is the most preferred monomer.

Monomers to be used as component aiv) are preferably commercially available as mixtures of alkenyl esters of branched tertiary carboxylic acids, containing each 9 carbons in the acid moiety, such as VEOVA 9 (VEOVA is a trademark of Shell for vinyl esters of VERSATIC acids, having 9 carbon atoms in their acid moiety (VERSATIC is a trademark)).

It will be appreciated that as component aiv) also mixtures of vinyl esters of branched tertiary carboxylic acids, having 9 carbon atoms in their acid residue, as major component (i.e. occurring in amounts of at least 80 wt % relative to the total weight of the component aiv) and preferably at least 90 wt %), and of vinyl esters of branched tertiary carboxylic acids, having a number of carbon atoms in their acid moiety other than 9, as minor component (<20 wt % and preferably<10 wt %), can be successfully applied in the powder coating compositions of the present invention.

Examples of said optional minor components aiv) are VEOVA 5, VEOVA 10 or VEOVA 11 esters of VERSATIC acids, having 5, 10 and 11 carbon atoms in their acid moiety respectively.

However preferably VEOVA 9 vinylesters will be applied as sole comonomer aiv).

Suitable monomers to be used as component av) can be selected from e.g. methyl acrylate, ethyl acrylate, n-propyl acrylate, isopropyl acrylate, n-butyl acrylate, isobutyl acrylate, ethyl-hexyl acrylate, isobornyl acrylate, cyclohexyl acrylate, methyl methacrylate, ethyl methacrylate, n-propyl methacrylate, n-butyl methacrylate, isopropyl methacrylate, isobutyl methacrylate, ethylhexyl methacrylate, isobornyl methacrylate, cyclohexyl methacrylate, methyl crotonate, ethyl crotonate, n-propyl crotonate, isopropyl crotonate, isobutyl crotonate, n-butyl crotonate, ethylhexyl crotonate, isobornyl crotonate, cyclohexyl crotonate.

The more preferred monomers av) are methyl methacrylate, methyl acrylate, isobornyl acrylate or isobornyl methacrylate, and the most preferred is methyl methacrylate.

Preferred proportions of component ai) are in the range of from 6 to 9 wt %.

Preferred proportions of component aii) are in the range of from 17 to 45 wt %.

Preferred proportions of component aiii) are in the range of from 20 to 43 wt %.

Preferred proportions of component aiv) are in the range of from 10 to 30 wt %.

Preferred proportions of component av) are in the range of from 0 to 30 wt %.

Suitable diacids to be used as components bi) and for the preparation of the polyester component bii) can be selected from 1,2-cyclohexanedicarboxylic acid (hexahydrophthalic acid), 1,3-cyclohexanedicarboxylic acid, 1,4-cyclohexanedicarboxylic acid, tetradecanedioic acid, succinic acid, glutaric acid, adipic acid, malonic acid, azelaic acid, pimelic acid, suberic acid, dodecanedioic acid, sebacic acid, their anhydrides, nadic methyl anhydride and mixtures thereof, or anhydrides thereof. Dodecanedioic acid and 1,2-cyclohexanedicarboxylic anhydride are the preferred acids.

The polyhydric alcohol component for the polyesters bii) can be suitably selected from e.g. ethylene glycol, diethylene glycol, 1,2-propanediol, 1,3-propanediol, 1,4-butanediol, 2-methyl-1,3-propanediol, neopentyl glycol, 1,5-pentanediol, 3-methyl-1,5-pentanediol, 2-butyl-2-ethyl-1,3-propanediol, 1,6-hexanediol, 1,4-cyclohexanedimethanol, 1,4-cyclohexane diol, neopentyl glycol, hydroxypivalate, trimethylolpropane, di(trimethylolpropane), hydrogenated bisphenol A, hydrogenated bisphenol F, pentaerythritol, and mixtures thereof. Branched polyhydroalkanes such as di(trimethylolpropane) or trimethylolpropane are the preferred polyols.

For the preparation of polyester bii) di-trimethylolpropane and hexahydrophthalic anhydride are most preferred.

More preferably a polyester bii) is applied, which has been derived from 0.2 to 0.3 moles di-trimethylol propane per mol hexahydrophthalic anhydride, and having an acid value of from 4600 to 4900 mmol/kg.

According to preferred embodiments of the powder coating compositions copolymer components (a) are to be included, which show an epoxy group content in the range of from 1000 to 4000 meq/kg and preferably from 2000 to 3000 meq/kg.

More in particular the weight average molecular weight of the copolymer (a) components is in the range of from 2000 to 10.000 and preferably from 4000 to 7000.

More preferably the copolymer components (a) are prepared by mass (or bulk) polymerization, i.e. without any solvent of the components ai) through av) at a temperature in the range of from 155 to 180° C., and in the presence of a radical polymerization catalyst such as peroxides, diazo compounds and the like of which the peroxide catalysts are preferred e.g. di-tert-butyl peroxide, di-tert-amyl peroxide. According to a preferred embodiment of said preparation process of component (a) the copolymerization is carried out in an extruder.

An important advantage of the curable powder compositions of the present invention is formed by the lower curing temperature, which has to be applied, e.g. 140° C. during 30 minutes instead of the conventional temperature of 175 and higher, in combination with a good flow-out and a good stability.

The most preferred coating compositions comprise components (bi) and (bii) in an equivalent ratio of from 0.300:1 to 2.800:1.

It will be appreciated that if desired, curing catalysts can be included in the powder coating compositions in order to reach the desired low temperature curing, i.e. in the temperature range of from 100 to 140° C. Examples of said curing catalysts are the quaternary ammonium salts, such as tetra(2-4-alkyl)ammonium halide and more in particular e.g. tetrabutylammonium bromide, tetrabutylammoniumchloride, or tin salts of carboxylic acids having from 6–16 carbon atoms, such as tin octoate.

The invention can be further illustrated by the following examples, however without restricting its scope to these embodiments.

EXAMPLE I (a) Acrylic Resins Preparation by Bulk Polymerization:

The reactor is charged with the vinylester of tertiary branched acid monomer and dialkyl ester of ethylenically unsaturated diacid in amounts listed in the table 1 hereinafter, (MMA: methyl methacrylate, DMM: dimethyl maleate, GMA: glycidyl methacrylate) and heated to a temperature to 155° C. under a nitrogen blanket.

When a temperature of 155° C. is reached, the addition of the other monomers/initiator, listed in Table 1, is started. The monomers/initiator are added over a period of 5 hours via a pump. After the addition is completed, the temperature is raised to 170° C. and is maintained for 2 hours.

TABLE 1

| Monomer type Resin Coded by experiment | ratio is expressed in % mm | | | | |
|---|---|---|---|---|---|
| | VeoVa 9 | Styrene | MMA | DMM | GMA |
| a | 22 | 43 | 11.5 | 6.5 | 17 |
| b* | 22 | 20 | 34.5 | 6.5 | 17 |
| c | 22 | 20 | 21.5 | 6.5 | 30 |
| Comp. 1# | 22 | 20 | 21.5 | 6.5 | 30 |
| Comp. 2 | 22 | 20 | 28 | 0 | 30 |

*resin has been made at temp. of 165° C.
resin has been made at 175° C.

The physical parameters of the obtained resins are listed in Table 2.

TABLE 2

| Resin coded by experiment | MW | Mw/Mn | Visc. Poise[a] | EGC meq/kg | appearance |
|---|---|---|---|---|---|
| a | 7390 | 2.57 | 20 | 1147 | clear |
| b | 4440 | 3.21 | 3 | 1163 | clear |
| c | 6810 | 3.81 | 5–6 | 2032 | clear |
| comp. 1 | 4120 | 3.25 | 1–2 | 2073 | hazy |

TABLE 2-continued

| Resin coded by experiment | MW | Mw/Mn | Visc. Poise[a] | EGC meq/kg | appearance |
|---|---|---|---|---|---|
| comp. 2 | 8030 | 4.47 | 10 | 2037 | hazy, milky |

[a]melt viscosity at 200° C. measured with ICI cone and plate.

(b) Polyester Preparations (b,1) A 2 1 reactor was filled with 616,68 g (4 mols) of 1,2-cyclohexanedicarboxylic anhydride (1,2-CHDA) and 250 g (1 mole) of di-trimethylolpropane. The reactor was equipped with a condenser under nitrogen and a stirrer. The reaction mixture was heated slowly to 155° C. and kept for two hours. The viscous resin was then dumped in an aluminium tray.

The product had the following properties:
appearance: clear solid
acid value: 4635 meq/kg
melt viscosity: 13 Poise at 175° C. measured with a ICI cone and plate.

As alternative polyester resins were prepared (b,2)

TABLE 3

| Code resin | Anhydride | Alcohol | Appearance | Acid value | Melt Viscosity[a] |
|---|---|---|---|---|---|
| TMP-1, 2 CHDA | 1, 2 CHDA 3 moles | TMP 1 mole | clear solid | 4896 | 4–5 poise |

[a]at 175° C. measured with a ICI cone & plate (b,3) For comparison the polyester described in the U.S. Pat. No. 5,625,028 (EASTMAN) was prepared and a summary is given below:

A reactor equipped of a stirrer, a Dean-Stark trap with cooler and a nitrogen inlet was charged with 640.4 grams (3.2 moles) of 1,4 dimethylester cyclohexanedicarboxylate (which is liquid) and 346.44 grams (3.84 moles) of 1,4 butane diol (BDO) At 25° C. the two liquid are not fully miscible. About 1 ml of Ti (isopropoxide)$_3$ was added to the mixture.

The reaction mixture is heated to 170° C. in 30 minutes. At this stage the methanol starts to distil. The temperature is raised up to 200° C. when about 220 ml of methanol have been collected. When no more methanol is collected a slight vacuum is applied. After completion of the distillation (about 4 hours), 114,35 grams of 1,4 cyclohexane dicarboxylic acid (a solid) is added. Immediately water started to distil, the temperature is increased to 210–220° C. The end of water distillation was observed after about 4 hours. The low viscous liquid was cooled down to 180° C. and dumped in an aluminium tray. The hot liquid was water like and on cooling starts to be haze and end as white waxy solid.

Properties:
white waxy solid
acid value 826 mmole/kg

The resin could not be ground with a conventional hammer mill and was reduced to small piece by hand and used as such in the formulations.

(c) Formulation and Powder Application (c,i) Formulation Composition

The curing agent is a blend of dodecanedioic acid (DDA) and an acid polyester resin made as described above (Di-TMP-1,2 CHDA). The acid polyester resin has an acid value of 4635 mmole/kg.

The molar ratio acid on epoxy groups was for all the formulations equal to 0.78. The ratio binder (acrylic resin and acid curing agent)/benzoin (degassing agent) and MODAFLOW powder III (solid flow control agent ex Monsanto) was kept constant and is respectively 1 weight percent for benzoin and 1.5 weight percent the Modaflow. The table below gives the exact quantity used for the trials. The resins used in the formulations below were coarse ground before use.

TABLE 4

| Formulation (lab code) | Acrylic resin/ weight | Di-TMP/ 1, 2 CHDA | DDA | Benzoin/ MODAFLOW |
|---|---|---|---|---|
| A | a/700 | 74 | 64 | 8.4/12.5 |
| B | b/700 | 76 | 65 | 8.5/12.6 |
| C | c/500 | 94 | 81 | 6.8/10.2 |

In comparative formulations three commercial acrylic copolymer components PD6100, PD7690 and PD7610 marketed by MITSUI were used, further identified as O, P and Q (the acrylic copolymer component PD7610 shows a strong thiol smell). These three acrylic copolymer components are recommended for the same coating applications and do not comprise the component aiv) according to the present invention, and have the following listed characteristics:

TABLE 5

| resin | Mw | Mw/Mn | viscosity poise[a] | EGC meq/kg | appearance |
|---|---|---|---|---|---|
| O(PD6100) | 6710 | 2.05 | 32 | 1000 | clear |
| P(PD7690) | 5290 | 2.26 | 20 | 2130 | clear |
| Q(PD7610) | 4080 | 1.76 | 15 | 1960 | clear |

[a]melt viscosity measured at 200° C. with ICI cone and plate.

COMPARATIVE EXAMPLES

TABLE 6

| Formulation | Acrylic resin/weight | Eastman polyester | DDA | Benzoin/ MODAFLOW |
|---|---|---|---|---|
| Comp. I | Q/400 | 414 | 60 | 8.7/13.11 |
| Comp. II | O/800 | 420 | 61.2 | 12.8/19/2 |
| Comp. III | P/400 | 444 | 66.4 | 9.1/13.65 |
| Comp. IV | P/400 | Di-TMP-HHA 77.4 | 66.4 | 5.4/8.15 |
| Comp. V | Q/500 | 89 | 76.4 | 6.65/9.98 |

The formulations were placed on a roller bank for at least one hour before extrusion.

d) Extrusion

A Buss single screw extruder PLK46 was used. The screw speed was 80 rpm. Temperatures setting considered: 70° C. and 90° C. All the formulations were extruded twice.

TABLE 7

| Behaviour during extrusion | |
|---|---|
| Formulation | Behaviour under processing |
| A | acceptable |
| B | stick strongly |
| C | good |
| Comp. I | very sticky |
| Comp. II | very sticky |

TABLE 7-continued

| Behaviour during extrusion | |
|---|---|
| Formulation | Behaviour under processing |
| Comp. III | very sticky |
| Comp. IV | good |
| Comp. V | good | e) Milling, Application and Cure

The extrudates were then flattened using cooled rolls and fine milled in the jet grinding mill Alpine AFG at 1790 rpm. Powders were additionally sieved using a 300$\mu$ sieve to exclude any granules.

All powders were applied on QD bare steel panels (ex Q-panel Company). They are made from standard low-carbon cold-rolled steel and have a bright, smooth finish.

Powders were applied by electrostatic spraying, using GEMA equipment.

Formulations A and C, were applied easily whereas the other formulations showed a tendency to agglomerate. The powder B was agglomerated after one night at room temperature.

The powders A and C were stable at room temperature.

For the comparative examples the extrudates of Compositions I, II and III resp. have a low through put during the find grinding operation. The powder stuck everywhere in the milling apparatus.

The powders Comp. I, Comp. II and Comp. III were agglomerated at room temperature after 2 hours. These powders were very difficult to spray.

Cure schedule was 30 minutes at 140° C.

f) Coating Properties

TABLE 8

| | Thickness | König Hardness | Reverse Impact | MEK resistance | Acid resistance | | |
|---|---|---|---|---|---|---|---|
| | $\mu$m | sec | lb | db. rubs | 90 | 60 | 30 |
| | | | | 30 minutes at 140° C. | | | |
| Comp. IV | 35–45 | 190 | <10 | >100 LW++ | NA | NA | NA |
| Comp. V | 35–40 | 186 | <10 | >100 LW++ | NA | NA | NA |
| A | 40–60 | 217 | <10 | >100 LW++ | NA | NA | NA |
| C | 28–30 | 194 | <10 | >100 LW++ | NA | NA | NA |

Polyester Eastman is based on 1,4 CHDA and BDO; the polyester comp. of the invention is based on Di-TMP-1,2 CHDA.

a: acid resistance test: a droplet of sulphuric acid 0.6 N was put on the panel (not covered by a watch glass) for 30, 60 and 90 minutes at a temperature of 50° C.

Acid Resistance Ratings

NA: no attack

MEK Resistance Ratings (Cottons with MEK, Double Rubs)

L: lines on the coatings

W: the coating is white after the test

L→L+>L++.

EXAMPLE II

II,1 Synthesis of the Polyester Resin

Polyester resins were prepared from HHPA: hexahydrophathalic anhydride, TMP: trimethylol propane, DTMP: ditrimethylol propane, DDA: dodecanedoic acid in a 2 1 reactor with nitrogen and a Dean Stark trap.

Step 1

290 g of TMP and 245 g of dodecanedoic acid were charged in the reactor the temperature was bring to 180° C. and when the blend was homogeneous (around 120–130° C.) 2 g of SnCl$_2$OH$_2$ were added.

The water start to be formed at this stage and the temperature is gradually increased to 200 0C. After 1 hour 37 ml of water was collected and at this stage a vacuum (950–850 mmHg) was applied an extra 4 ml water was collected. The acid value was measured, 54 mmole/kg.

Step 2

The temperature was dropped to 130° C. When reached 657 g of liquid HHPA (HHPA was pre-heated at 80° C.) was added, the intern temperature dropped to 95° C.. The temperature was risen to 130° C. at the this stage the exothermic reaction starts and the heating was switch off, the maximum intern temperature was 155° C.. The temperature was kept below 160° C. by external air flow. After 10 minutes the temperature dropped to 150° C. and was maintained at 160° C. for 2 hours before dumping.

The product characteristics:

yellowish clear solid acid value 3975 mmole/kg

TABLE 9

Crosslinker compositions

| codes | Structure |
|---|---|
| CG242 | (HHPA)2-DTMP-(HHPA)2 |
| CG242A | (HHPA)2-DTMP-(HHPA)2/DDA melted (0.69) |
| CG242B | (HHPA)2-DTMP-(HHPA)2/DDA melted (1.38) |
| CD33.98 | (HHPA)2-TMP-DDA-TMP-(HHA)2 |
| CG242B | (HHPA)2-DTMP-(HHPA)2/DDA melted (1.38) |
| CG242C | (HHPA)2-DTMP-(HHPA)2/DDA melted (2.76) |

TABLE 10

Crosslinker characteristics

| Code | acid value m mole/kg | stability, at 40° C. | appearance |
|---|---|---|---|
| CG242 | 4635 | OK | clear, brittle, solid |
| CG242A | 6633 | OK | waxy solid |
| CG242B | 5962 | OK | waxy solid |
| CD33.98 | 3975 | blocked | yellow solid, brittle, slight tacky |
| CD11.98 | 5083 | OK | clear solid, brittle, |
| CG242C | 5488 | OK | waxy solid |

OK = ground resin stable, blocked = ground resin agglomerates to form one block.

II,2 Acrylic Used

All the resins were produced according the mass polymerisation process EXCEPT for the comparative examples produced in solvent (xylene), the solvent was removed under vacuum. The per-oxide was always di-tert-butyl-peroxide. The resin CG 343 was produced as described in EP-B-0 728 163, example B.

TABLE 11

Composition of acrylic resins

| % m/m | VV9 | STYR | MMA | GMA | DMM | BA |
|---|---|---|---|---|---|---|
| 333 | 22 | 30 | 11.5 | 30 | 6.5 | |
| 335 | 22 | 25 | 16.5 | 30 | 6.5 | |
| 340 | 22 | 20 | 21.5 | 30 | 6.5 | |
| 342 | 22 | 30 | 1.50 | 40 | 6.5 | |
| 347 | 22 | 30 | 16.5 | 25 | 6.5 | |
| 352 | 30 | 23.5 | 0 | 40 | 6.5 | |
| Comparative | | | | | | |
| 338 | 10 | 10 | 33.5 | 40 | 6.5 | |
| 346 | 10 | 20 | 33.5 | 30 | 6.5 | |
| 343* | | 10 | 40 | 40 | | 10 |
| 365 | | 10 | 49 | 30 | | 11 |
| 368 | | 10 | 42 | 40 | | 8 |

*resin composition/preparation are based on a recipe mentioned in EP-B-O 728 163, example B

TABLE 12

Resin characteristics

| | MW | Mw/Mn | Viscosity Poise | EGC, meq/kg | appearance | Stability 40° C. |
|---|---|---|---|---|---|---|
| 333 | 7698 | 2.80 | 21 (200) | 2060 | clear, solid brittle | ok |
| 335 | 7788 | 3.45 | 8 (200) | 2191 | clear, solid brittle | ok |
| 340 | 6880 | 3.28 | 8 (200) | 2042 | clear, solid brittle | blocked |
| 342 | — | — | — | 2728 | clear, solid brittle | ok |
| 347 | 8983 | 2.73 | 15 (200) | 1713 | clear, solid brittle | ok |
| comparative | | | | | | |
| 338 | 5347 | 2.95 | 32 (175) | 2779 | (M) slight hazy | blocked |
| 346 | 4753 | 2.98 | 14 (175) | 2062 | (M) clear, solid brittle | blocked |
| 343 | 4505 | 1.99 | 10 (200) | 2679 | clear, solid brittle | blocked |

TABLE 12-continued

Resin characteristics

| | MW | Mw/Mn | Viscosity Poise | EGC, meq/kg | appearance | Stability 40° C. |
|---|---|---|---|---|---|---|
| 365 | — | — | — | 2098 | clear, solid | ok |
| 368 | — | — | — | 2817 | clear, solid | ok |

OK = ground resin stable, blocked = ground resin agglomerates to form one block.
— = not measured
(M): smell of MMA

TABLE 13

Resin composition with different VEOVA-types

| Code | VV9 | VV10 | VV5 | VV11 | STYR | MMA | GMA | DMM |
|---|---|---|---|---|---|---|---|---|
| CG357 | 17.6 | 4.4 | | | 30 | 11.5 | 30 | 6.5 |
| CG359 | 17.6 | | 4.4 | | 30 | 11.5 | 30 | 6.5 |
| CG362 | 17.6 | | | 4.4 | 30 | 11.5 | 30 | 6.5 |

It was observed that the presence of VV5 as comonomer had an unexpected effect on the exotherm of the reaction. On laboratory scale no increase of the temperature was observed in case of the production of CG359.

TABLE 14

Resin Characteristics: different VeoVa -types

| code | EGC, meq/kg | appearance | stability at 40° C. |
|---|---|---|---|
| CG357 | 2067 | clear | OK |
| CG359 | 2047 | clear | OK |
| CG362 | 2042 | clear | OK |

OK = ground resin stable.

II,3 Powder Formulations and Coating Properties

TABLE 15

Powder composition in weight with the different crosslinkers

| | resin | | crosslinker | | powder III | benzoin |
|---|---|---|---|---|---|---|
| code | type | g | type | g | g | g |
| CD47 | 340 | 500 | CG242 | 220.28 | 10.8 | 7.20 |
| CD48 | | | CG242A | 153.93 | 9.81 | 6.54 |
| CD50 | | | CD33.98 | 256.86 | 11.35 | 7.57 |
| CD54 | | | CD33.98 | 230.94 | 0 | 0 |
| CG18 | | | CG242C | 149.6 | 8.2 | 5.5 |
| CG20 | | | AA | 67.5 | 7.8 | 5.2 |
| CG1 | CG333 | 420 | DDA | 99.4 | 7.8 | 5.2 |
| CG4 | | 400 | CG242B | 136.7 | 8.1 | 5.4 |

TABLE 16

Coatings properties of the crosslinkers mentioned in Table 9

| Code | Thickness μm | König Hardness sec | Direct Impact inch.lb | MEK db. Rubs | Resistance fuel | acid at 50° C., for XX minutes 90 | 60 | 30 | flow |
|---|---|---|---|---|---|---|---|---|---|
| CD47 | 50–65 | 209 | 10 | >100L– | NA | NA | NA | NA | 6–7 |
| CD48 | 45–55 | 215 | 20 | >100lL– | NA | NA | NA | NA | 8 |
| CD50 | 70 | 206 | 20 | >100L– gloss lost | NA | NA | NA | NA | 6 |
| CD54 * | 60–71 | 213 | 10 | >100LW+ | mat | NA | NA | NA | 3 |
| CG18 | 50–58 | 206 | 14 | >100L+, m• | NA | NA | NA | NA | 5–6 |
| CG20 | 50–65 | 183 | 18 | >100L+ | NA | NA | NA | NA | 7–8 sg |
| CG1 | 45–52 | 194 | 24 | >100 | NA | NA | NA | NA | 7 |
| CG4 | 54–60 | 207 | 14 | >100 | NA | NA | NA | NA | 5 |

SG = sagging of the coating
* the coating based on CD 54 is crater/pinhole free, this was an unexpected result because this formulation contains no flow control agent which normally helps to improve flow but also lead to pinhole free films when incorporated according to the state of the art.

TABLE 17

Powder composition of the resins with GMA, VV9 and styrene variations with crosslinker CG242B

| Code | resin 500 g | cross-linker, 242 B g | powder III g | benzoin g | stability 40° C. |
|---|---|---|---|---|---|
| CD61 | CG333 | 169.8 | 10.0 | 6.7 | OK |
| CD67 | CG342 | 223.8 | 10.9 | 7.2 | OK |
| CD75 | CG347 | 141.2 | 9.6 | 6.4 | OK |
| CD81 | CG352 | 232.1 | 11.0 | 7.3 | OK |
| Comparative | | | | | |
| CD65 | CG338 | 229.1 | 10.9 | 7.3 | blocked |
| CD74 | CG346 | 170 | 10 | 6.7 | blocked |
| CD59 | CG343 | 220.9 | 10.8 | 7.2 | blocked |
| CG40 | CG365 | 175.6 | 10.1 | 6.8 | blocked |
| CG42 | CG368 | 235.8 | 11.0 | 7.4 | blocked |

Fuel Resistance Ratings (30 min Droplet Fuel Covered)

R: removable • recover after 30 minutes

NA: no attack

MEK Resistance Ratings (Cottons with MEK Double rubs)

L: lines on the coatings W: the coating is white after the test

>100 >100 mat · >100L--     >100 L -- mat · > 100L-
> 100 L- mat · > 100 L+     > 100 L + mat · > 100 L++
> 100 L ++ mat · > 100 LW     ++ (>100: good → bad)

TABLE 18

Coatings properties

| Code resin, powder | Thickness, μm | König Hardness, sec | Direct impact, inch.lb | MEK db. rubs | Resistance fuel | acid, at 50° C. for XX minutes 90 | 60 | 30 | Flow |
|---|---|---|---|---|---|---|---|---|---|
| 333, CD61 | 57–64 | 212 | 16 | >100 L– | NA | NA | NA | NA | 6 |
| 342, CD67 | 52–58 | 204 | 14 | >100 | Na | NA | NA | NA | 5–6 |
| 347, CD75 | 64–66 | 212 | 18 | >100 L–, mat • | NA | NA | NA | NA | 6 |
| 352, CD81 | 50–54 | 215 | 18 | >100 | NA | NA | NA | NA | 3–4 |
| | | | | comparative | | | | | |
| 338, CD65 | 48–52 | 199 | 12 | >100 L– | NA | NA | NA | NA | 7 |
| 346, CD74 | 52 | 194 | 14 | >100 L++ | NA | NA | NA | NA | 7 |
| 343, CD59 | 52–58 | 192 | 20 | >100 | NA | NA | NA | NA | 4 |
| 365, CG40 | 54–60 | 107 | 18 | >100 | NA | NA | NA | NA | HF* |
| 368, CG42 | 50–54 | 130 | 15 | >100 | NA | NA | NA | NA | HF* |

HF*: hammer finish coatings = very poor flow

Acid Resistance:

sulphuric acid 0.6N for 30,60,90 minutes

Flow ratings

This is a visual test: 10: good 0: bad

TABLE 19

Powder composition: different VeoVa -types

| code | resin type | CG 242B g | powder III g | benzoin g | stability 40° C. |
|---|---|---|---|---|---|
| CG31 | CG357 | 173.0 | 10.1 | 6.7 | OK |
| CG33 | CG359 | 172.2 | 10.1 | 9.7 | OK |
| CG37 | CG362 | 170.9 | 10.1 | 6.7 | border line |

TABLE 20

Coating properties: different VeoVa-types

| Code | Thickness μm | König Hardness sec | Direct Impact inch lb. | MEK resistance db. Rubs | Acid resistance | | | | flow |
|---|---|---|---|---|---|---|---|---|---|
| | | | | | fuel | 90 | 60 | 30 | |
| CG31 | 50–65 | 220 | 16 | >100 | NA | NA | NA | NA | 5–6 |
| CG33 | 54–60 | 215 | 16 | >100 L– | NA | NA | NA | NA | 4 |
| CG37 | 58–62 | 215 | 16 | >100 L– | NA | NA | NA | NA | 5 |

We claim:

1. A curable powder coating composition comprising:
   (a) a copolymer produced from;
      ai) 5 to 10 wt % of an alkyl diester of an ethylenically unsaturated dicarboxylic acid, comprising an alkyl group, having from 1 to 4 carbon atoms;
      aii) 15 to 55 wt % of a glycidylester of ethylenically unsaturated carboxylic acid;
      aiii) 10 to 45 wt % of a phenylalkene monomer having from 8 to 12 carbon atoms,,
      aiv) 10 to 35 wt % of an alkenyl ester of a branched tertiary carboxylic acid the acid moiety of which contains 9 carbon atoms; and
      av) 0 to 45 wt % of an alkyl ester of an etylenically unsaturated carboxylic acid, having from 3 to 4 carbon atoms in the acid moiety, and wherein the alkyl group contains from 1 to 12 carbon atoms the respective percentages of the components ai) through av) are relative to the total weight of the copolymer, while the sum of all actual percentages is 100%; and
   (b) a blend comprising:
      (bi) an aliphatic or cycloaliphatic dicarboxylic acid comprising from 4 to 16 carbon atoms; and
      (bii) a polyester resin, produced from a branched polyhydroxyalkane, having from 5 to 12 carbon atoms, and an aliphatic or cycloaliphatic dicarboxylic acid, having from 4 to 16 carbon atoms, or an anbydride thereof, in a molar ratio of from 0.2 to 0.4 mole of polyhydroxyalkane per mole of aliphatic or cycloaliphatic dicarboxylic acid, the polyester (bii) having an acid value of from 4500 to 4900 mmole/kg and the blend having an acid value from 5000 to 10,000, while the molar ratio between the acid groups and epoxy groups is in the range of from 0.70:1 to 1.10:1.

2. The powder coating composition of claim 1 wherein component ai) is dimethyl maleate, component aii) is glycidyl methacrylate, component aiii) is styrene, component aiv) is a vinyl ester of branched tertiary carboxylic acids having 9 carbon atoms, and component av) is methylacrylate, methyl methacrylate isobornyl acrylate, or isobornyl methacrylate.

3. The powder coating composition of claim 2 wherein component av) is methyl methacrylate.

4. The powder coating composition of claim 1 wherein the proportion of component ai) is in the range of from 6 to 9 wt %, the proportion of component aii) is in the range of from 17 to 45 wt %, the proportion of component aiii) is in the range of from 20 to 43 wt %, the proportion of component aiv) is in the range of from 10 to 30 wt %, and the proportion of component av) is in the range of from 0 to 30 wt %.

5. The powder coating composition of claim 1 wherein the copolymer component is produced by mass polymerization of the components ai) through av) at a temperature in the range of from 155 to 180° C. and in the presence of a radical polymerization catalyst.

6. The powder coating composition claim 1 wherein the curing component (b) comprises a polyester resin (bii), produced from 0.2 to 0.3 mol di-trimethylol propane per mol hexahydrophthalic anhydride, and having an acid value of from 4600 to 4900 mmol/kg.

7. The powder coating composition of claim 1 wherein the epoxy group content of the copolymer component (a) is in the range of from 2000 to 3000 meq/kg.

8. The powder coating composition of claim 1 wherein the weight average molecular weight of the copolymer (a) is in the range of from 2000 to 10,000.

9. The powder coating composition of claim 1 wherein the equivalent ratio between (bi) and (bii) is in the range 0.300:1 to 2.800:1.

10. A cured coating composition produced from the powder coating composition of claim 1.

11. A cured coating composition produced from the powder coating composition of claim 4.

12. A cured coating composition produced from the powder coating composition of claim 6.

13. A cured coating composition produced from the powder coating composition of claim 7.

14. A cured coating composition produced from the powder coating composition of claim 8.

* * * * *